US011794571B1

(12) United States Patent
Smith, Jr.

(10) Patent No.: US 11,794,571 B1
(45) Date of Patent: Oct. 24, 2023

(54) BLOW MOLDED FUEL TANK WITH SEPARATE INTERNAL BRACKETS

(71) Applicant: Honda Motor Co., Ltd., Tokyo (JP)

(72) Inventor: Leigh Robert Smith, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 285 days.

(21) Appl. No.: 17/119,230

(22) Filed: Dec. 11, 2020

Related U.S. Application Data

(60) Provisional application No. 62/948,086, filed on Dec. 13, 2019.

(51) Int. Cl.
| | |
|---|---|
| *B29C 49/20* | (2006.01) |
| *B60K 15/07* | (2006.01) |
| *B60K 15/077* | (2006.01) |
| *B29C 49/30* | (2006.01) |
| *B29C 49/48* | (2006.01) |
| *B29C 49/78* | (2006.01) |
| *B60K 15/03* | (2006.01) |
| *B29K 701/12* | (2006.01) |
| *B29L 31/00* | (2006.01) |

(52) U.S. Cl.
CPC ............ *B60K 15/077* (2013.01); *B29C 49/20* (2013.01); *B29C 49/30* (2013.01); *B29C 49/48* (2013.01); *B29C 49/78* (2013.01); *B29C 2049/2013* (2013.01); *B29K 2701/12* (2013.01); *B29L 2031/7172* (2013.01); *B60K 2015/03046* (2013.01); *B60K 2015/03243* (2013.01); *B60K 2015/03493* (2013.01)

(58) Field of Classification Search
CPC ........ B60K 15/077; B60K 2015/03046; B60K 2015/03243; B60K 2015/03493; B29C 49/20; B29C 2049/2013
See application file for complete search history.

(56) References Cited

U.S. PATENT DOCUMENTS

| | | | |
|---|---|---|---|
| 5,514,323 A | 5/1996 | Ramioulle | |
| 6,712,234 B2 | 3/2004 | Boecker | |
| 8,282,875 B2 | 10/2012 | Roos et al. | |
| 8,584,339 B2 | 11/2013 | Mbog et al. | |
| 9,085,229 B2 | 7/2015 | Gattozzi et al. | |
| 2002/0125254 A1* | 9/2002 | Hagano | B60K 15/03177 220/562 |
| 2012/0227237 A1* | 9/2012 | Tabuchi | B29D 22/003 248/231.61 |

(Continued)

FOREIGN PATENT DOCUMENTS

| | | |
|---|---|---|
| WO | 2008003387 A1 | 1/2008 |
| WO | 2018122414 A1 | 7/2018 |

*Primary Examiner* — Robert B Davis
(74) *Attorney, Agent, or Firm* — Plumsea Law Group, LLC

(57) ABSTRACT

A blow molded thermoplastic fuel tank with built-in fuel system components inside of the tank on separate and spaced apart internal brackets reduces the detrimental effects of thermoplastic swell to ensure fuel volume capacity is maximized, and appropriate clearances with the fuel tank wall are maintained. An internal configuration with separate spaced apart brackets provides more design freedom in the shape and configuration of the tank while enabling the tank shape to be thinner overall and fit within tighter spaces. The separate brackets also act as baffles to prevent sloshing noises of liquid fuel in the tank.

19 Claims, 11 Drawing Sheets

(56) References Cited

U.S. PATENT DOCUMENTS

| | | |
|---|---|---|
| 2013/0160274 A1 | 6/2013 | De Man et al. |
| 2014/0117591 A1* | 5/2014 | Roos ............... B29C 49/20 |
| | | 264/516 |
| 2017/0232834 A1 | 8/2017 | Diestelhorst |
| 2018/0154769 A1* | 6/2018 | Lee ............... B60K 15/03 |

* cited by examiner

BLOW MOLDED FUEL TANK WITH SEPARATE INTERNAL BRACKETS

REFERENCE TO RELATED APPLICATION

This application claims priority to co-pending provisional application number 62/948,086 filed Dec. 13, 2019, the entirety of which is hereby incorporated by reference.

BACKGROUND

The present disclosure relates to a thermoplastic fuel tank with an internal bracket system comprising multiple brackets for mounting components to the inside of the tank.

Thermoplastic fuel tanks have been preferred for vehicles for the advantages they afford over metal tanks. Among many advantages, chief among them are improved fuel efficiency due to lighter weight, and versatility of configuration since a blow molded plastic fuel tank can be made to conform to virtually any available space in an undercarriage and occupy maximum volume with complex contours and shapes possible through processes like blow molding and injection molding. In addition to these factors, the seamless construction of a plastic fuel tank improves durability as it can deform and rebound while maintaining original volume and safe tank pressure. Thermoplastic fuel tanks also have the advantage of being non- corrosive.

In general, a number of components for filtering the fuel supplied to the engine, for supplying the engine with fuel, for monitoring the fuel level in the tank, for ventilating the tank, for reducing noise of fuel movement or sloshing, and for regulating pressure, among others, may need to be mounted inside of the plastic fuel tank. Conventionally such components are mounted on a sizeable bracket to an internal wall of the tank. Thermoplastic materials employed for such a bracket, due to interaction with fuel, have a certain tendency to swell which can affect the fill volume of the tank. The size of such of a monolithic internal bracket can also affect the fuel tank geometry and require a larger volume and size for the tank.

Improving the internal bracket structure will address these issues and provide more flexibility in the geometry of the tank and therefore its fit and placement.

SUMMARY

A blow molded thermoplastic fuel tank with built-in fuel system components inside of the tank on separate and spaced apart internal brackets reduces the detrimental effects of thermoplastic swell to ensure fuel volume capacity is maximized, and appropriate clearances with the fuel tank wall are maintained. An internal configuration with separate spaced apart brackets provides more design freedom in the shape and configuration of the tank while enabling the tank shape to be thinner overall and fit within tighter spaces. The separate brackets also act as baffles to prevent sloshing noises of liquid fuel in the tank.

The thermoplastic fuel tank has a blow molded body defining a wall with an exterior surface and an interior space, and a plurality of internal brackets attached to the wall within the interior space. Each internal bracket supports a separate fuel system component, and the internal brackets are separate from and spaced apart from one another. The brackets may act as baffles to reduce the sloshing of liquid fuel in the tank and reduce the noise. The separate brackets also enable the tank to have complex contoured body and have a configuration that may be smaller, thinner, or more distributed. The fuel system components mounted on the brackets may be component such as a valve, a fuel pump, a fuel filter, a pressure regulator, level sensor or the like. The brackets for each fuel system component will be placed in the tank at an advantageous location to correspond to the placement of a cooperating component outside of the fuel tank. For example, the any fuel system component that performs a last process to the fuel supplied to the engine may be located near the fuel supply connection to the tank.

Another aspect of the disclosure is a jig that is cooperates with the tooling during the blow molding process and holds the brackets and fuel system components in place within the mold during the blow molding process and within the parison so that the components are placed inside the finished tank after blow molding. The jig includes a base, a first holder attached to the base and presenting a first component support platform. The component support platform may include a clamp and a registration element. The jig may also include a second holder attached to the base and spaced apart from the first holder, the second holder having a second component platform. The second component support platform may include a clamp and a registration element.

The jig may include a cylinder and slide mechanism on at least one of the component support platforms to move the component toward or away from the registration element. The registration element may also include a support plate onto which the component is pressed or impinged for accurate placement within the tank. The registration element may also include a load cell or other appropriate sensor to measure and monitor the pressure applied to prevent damage to the component and to preserve a predetermined tolerance between the component and the interior wall of the tank.

Another aspect of the disclosure is a blow molding assembly for use in a blow molding machine, the assembly including a mold with mold halves movable from an open position to a closed position, a multi-layer thermoplastic parison adapted to be placed in the mold, and a jig for supporting fuel system components to be placed inside the tank. The jig is positioned within the parison and comprises a base, a first holder attached to said base and comprising a first component support platform for supporting a first fuel system component, and a second holder attached to the base and comprising a second component support platform for supporting a second fuel system component. The first holder and the second holder are spaced apart from one another so as to be located in different areas of the tank interior. The component support platforms may have the registration elements, the clamps, the movable slides and sensors as described previously.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Thermoplastic fuel tanks for vehicles are now more commonly employed than metal tanks due to the advantages offered such as lighter weight for fuel economy, durability and the flexibility of shaping the tank with various contours. Many varieties of plastic may be suitable such as plastics that belong to the category of thermoplastics. In particular, polyolefins, thermoplastic polyesters, polyketones, polyamides and copolymers thereof may be used. A blend of polymers or copolymers may also be used, as well as a blend of polymer materials with inorganic, organic and/or natural fillers. Such fillers may include but are not limited to carbon, salts and other inorganic derivatives, natural fibers or polymer fibers. Multilayer materials may also be used consisting of stacked layers bonded together, comprising at least one of the polymers or copolymers described above. One polymer that may be employed is polyethylene, and high-density polyethylene (HDPE) in particular.

Among the factors to be considered in choosing the materials is that HDPE is essentially not resistant to hydrocarbon diffusion and, when in contact with hydrocarbons, has a certain tendency to swell. To eliminate any potential problems caused by this tendency of HDPE to swell when in contact with fuel, multilayer plastic coextrudates that comprise barrier layers for hydrocarbons have been employed to form the preform or parison for the tank in a thermoplastic molding process. The barrier layer(s) are chosen to minimize the permeability of the liquids and gases in contact with the inside wall of the tank. Fuel-impermeable materials such as EVOH (a partially hydrolyzed ethylene/vinyl acetate copolymer) are possibilities, as well as subjecting the tank to a surface treatment (fluorination or sulphonation) for the purpose of making it impermeable to the fuel.

Fuel tanks for motor vehicles may be designed as fluid-tight systems suitable for containing, for example, hydrocarbons such as volatile liquid fuels for internal combustion engines, heavy liquid fuels such as diesels or gaseous fuels such as natural gas. Modern fuel tanks are designed to minimize hydrocarbon emissions. Any excess pressure in the tank is equalized by means of venting lines, which communicate with the atmosphere by way of one or more fuel vapor filters, so that only gas with hydrocarbons removed may be emitted. In order to economize on space considerations in the undercarriage or in and around the engine compartment, the components necessary for filtering and supplying the engine with fuel, for monitoring the fuel level in the tank, for ventilating the tank, for regulating pressure, among others, may be disposed inside the fuel tank. The fuel pump or components thereof, the fuel filter or components thereof may therefore be fitted and attached internally in the fuel tank. The internal components may also incorporate other accessories such as gates and valves such as a non-return valve or a value for preventing overfill.

Figure 1:
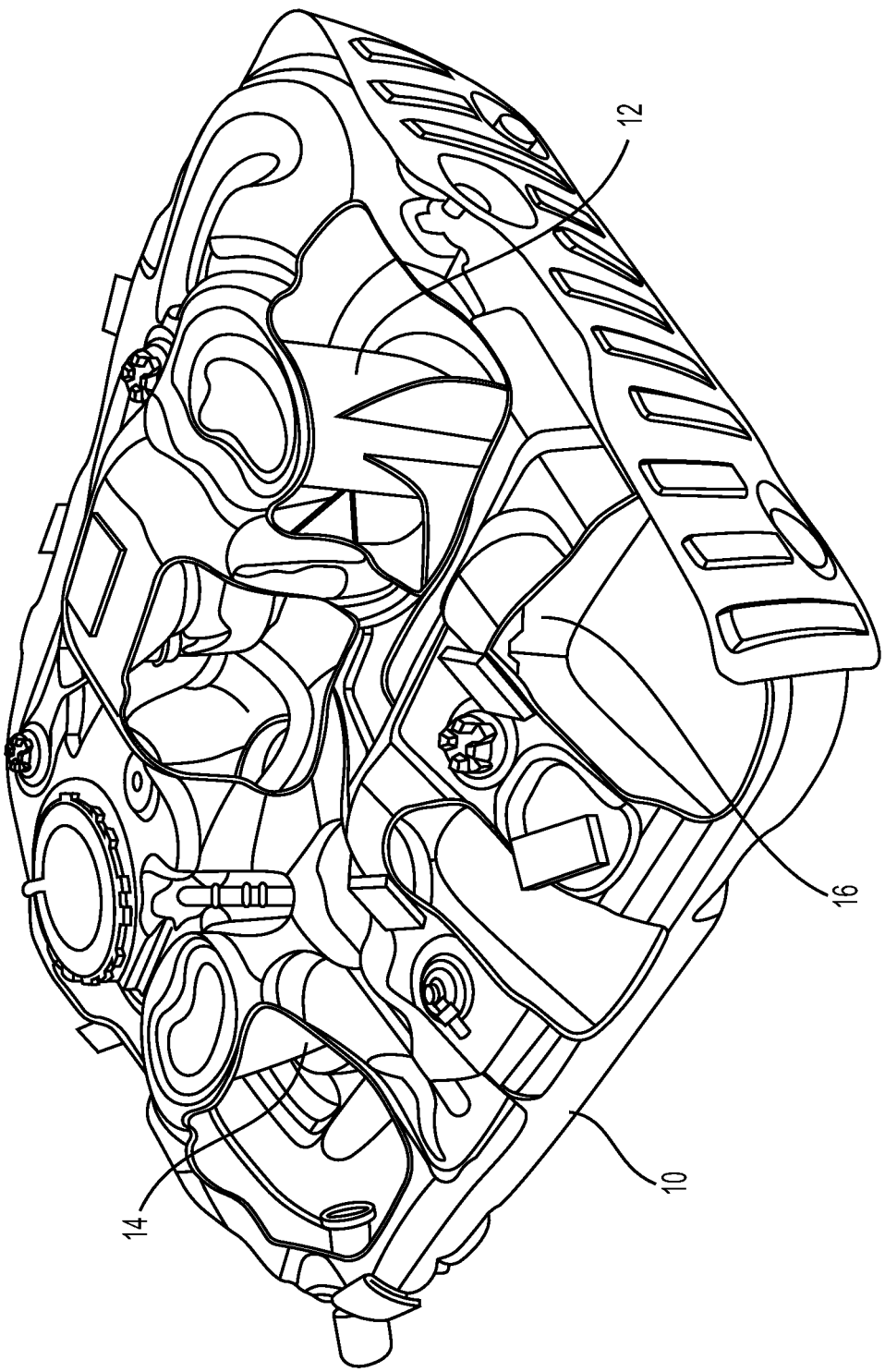
FIG. 1 is a perspective view of a conventional thermoplastic fuel tank with cutaways to show some of the internal components.

Thermoplastic fuel tank 10 shown in FIG. 1 is a conventional example of a built-in-fuel system tank (BFS) illustrated with cutaways to show some of the internal components. Fuel tank 10 generally may include a valve component 12, and a pressure regulator component 14 mounted on a thermoplastic bracket structure 16 placed inside the tank. Bracket structure 16 is generally a single monolithic structure that is formed to provide mounting areas for a number of internal built-in components. In the past, such built-in components may have been mounted by cutting the formed fuel tank and positioning and attaching the internal components and then sealing the openings. Due to the concern over emissions, the aim has been to reduce or eliminate the number of openings that must be sealed on a fuel tank. It has been found advantageous to manufacture the fuel tank by a process which enables the internal bracket structure 16 to be placed within the tank while the tank is formed.

Figure 2:
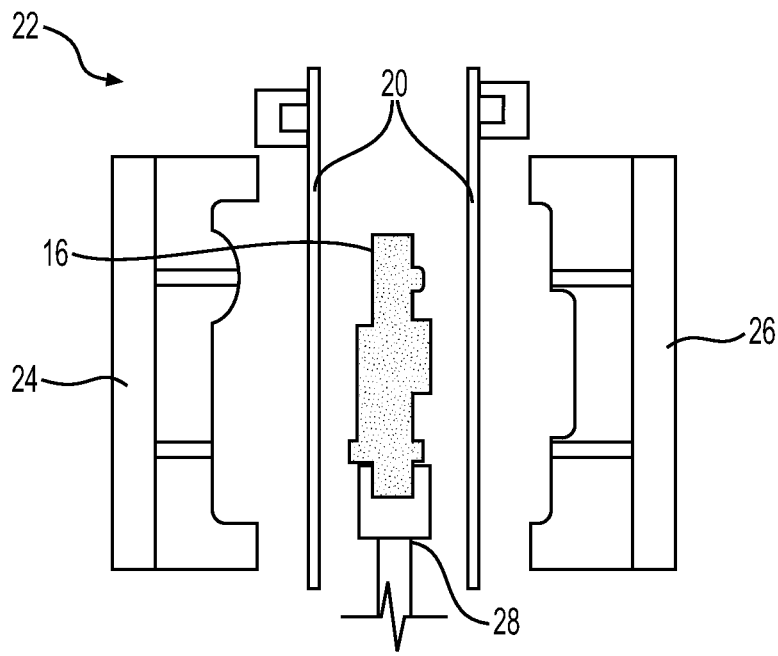
FIG. 2 is a schematic view of a step in the blow molding process to form a thermoplastic fuel tank with the tooling shown apart with a parison inserted.
Figure 3:
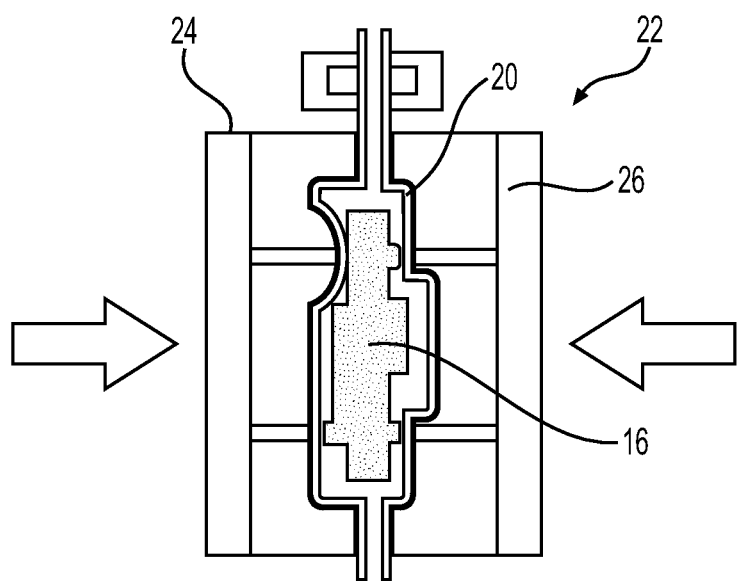
FIG. 3 is a schematic view of another step in the blow molding process of FIG. 2 showing the tooling shown closed while blow molding the parison to form the thermoplastic fuel tank.
Figure 4:
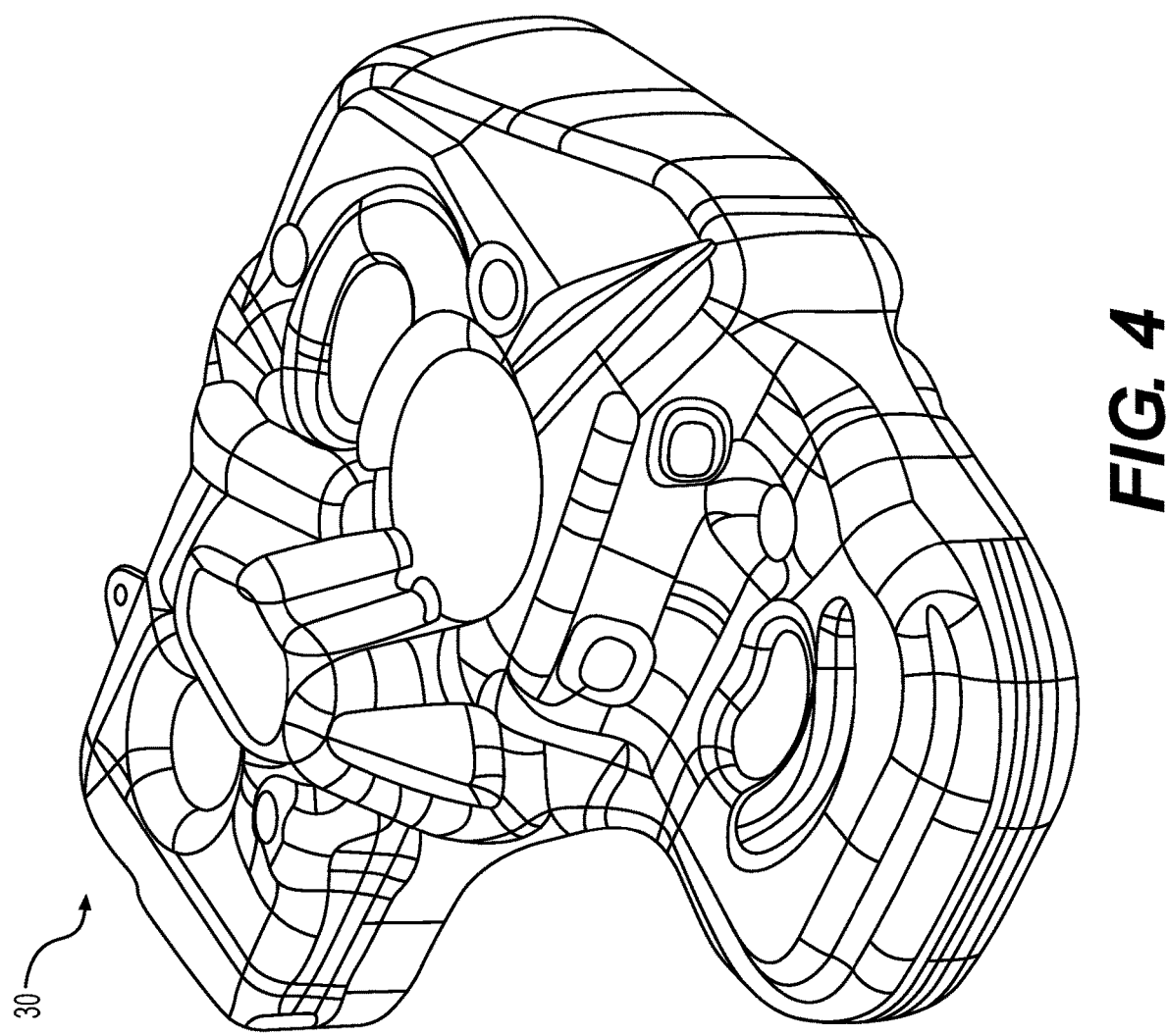
FIG. 4 is a perspective view of a thermoplastic fuel tank made in accordance with the present disclosure.

One way of producing this type of BFS tank is illustrated schematically in FIGS. 2 and 3. These schematic figures illustrate a blow molding process which starts with a preform or parison 20 likely formed from a multilayer thermoplastic structure which is provided into a mold 22 comprising mold halves 24 and 26. While the tooling separated, a fixture 28 may be used to retain bracket structure 16 in place between the mold halves. Mold 22 is closed by moving mold halves toward each other as indicated by the arrows in FIG. 3, and the parison is blow molded inside the mold to form the fuel tank. As can be seen in FIG. 3, bracket structure 16 is thus disposed internally of the fuel tank. It will be understood that the upper surface of the finished fuel tank may be the side formed by mold half 26, or may be the side formed by mold half 24. The orientation may be variable depending on other manufacturing considerations.

Once the fuel tank is formed by blow molding and thereby sealing the parison, the tank is removed from the mold for post-mold processing which may include cleaning and trimming excess material. In some instances, the finished tank may be cut to insert and attach components onto the bracket structure.

In some instances, the bracket structure 16 may serve as an internal baffle to reduce the sloshing noises within the tank, and the structure is sometimes referred to as a baffle.

In this way, a single piece, monolithic bracket or baffle has been used as the internal mounting structure for the built-in components in a finished fuel tank. Bracket 16 is normally formed of a thermoplastic material, and as noted above, this material will swell when in contact with fuel. A single piece bracket may be a web-like structure inside of the tank because it must span and reach the different locations inside the tank in which the components will be mounted. The presence of a relatively large structure within the tank, made of a material that is subject to hydrocarbon diffusion, may result in an overall reduction of volume of the tank available for fuel as the bracket structure swells and occupies more volume. In addition, the swelling caused by hydrocarbon diffusion may displace certain mounted components sufficiently over time to make their function less than optimal. For example, reducing the clearance space for a gate or valve due to the growth by hydrocarbon diffusion of the mounting structure may result in interference of the valve's operation to a less than optimal range. Because of the tight spaces and clearances in a vehicle fuel tank, even a small amount of swell may be disadvantageous for optimal function of the internal components.

Figure 5:
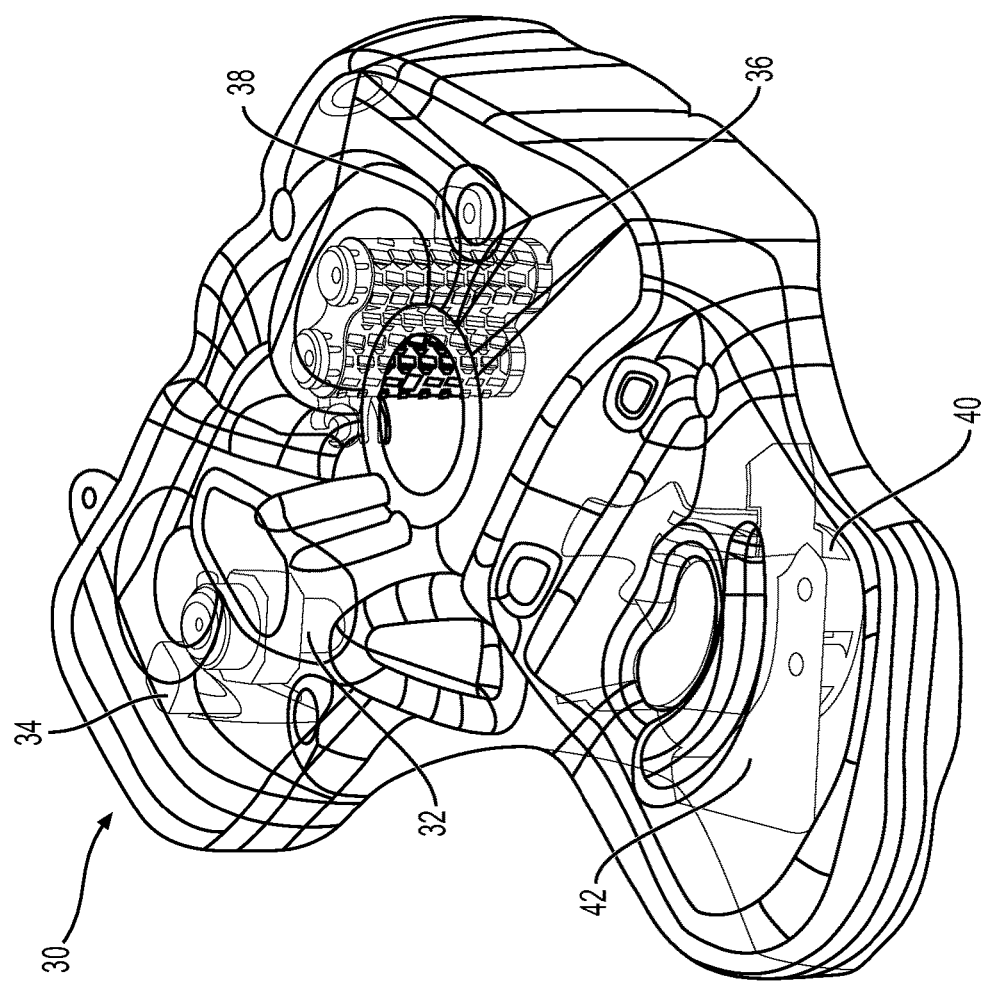
FIG. 5 is the same view as FIG. 4 showing the tank in phantom to illustrate the internal components and their placement.
Figure 6:
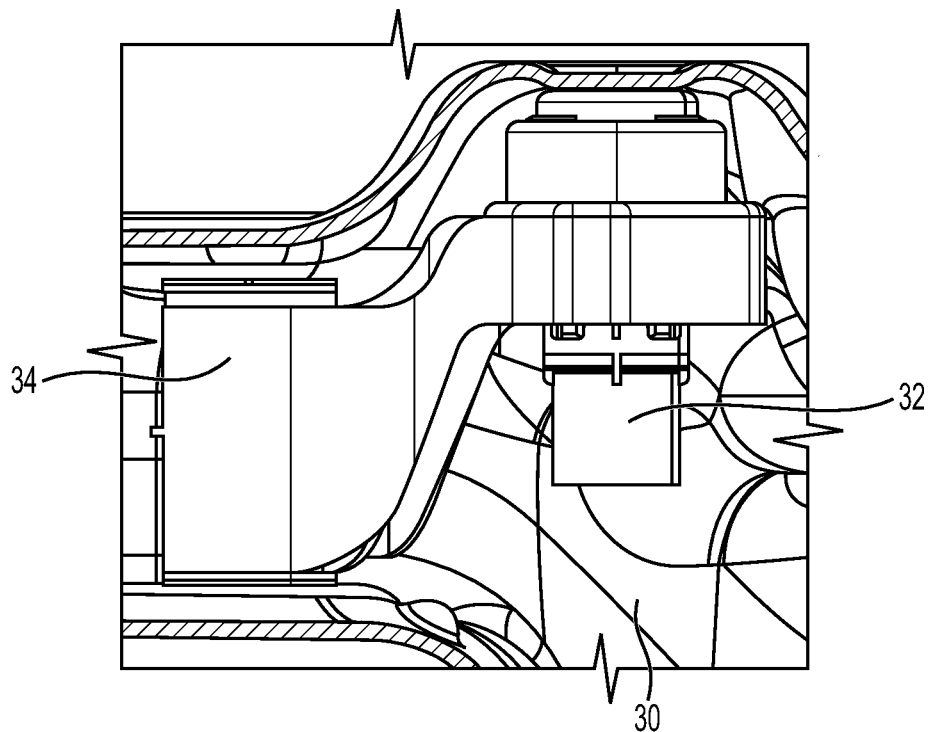
FIG. 6 is a detailed cross-sectional view of one of the components shown in FIG. 5.
Figure 7:
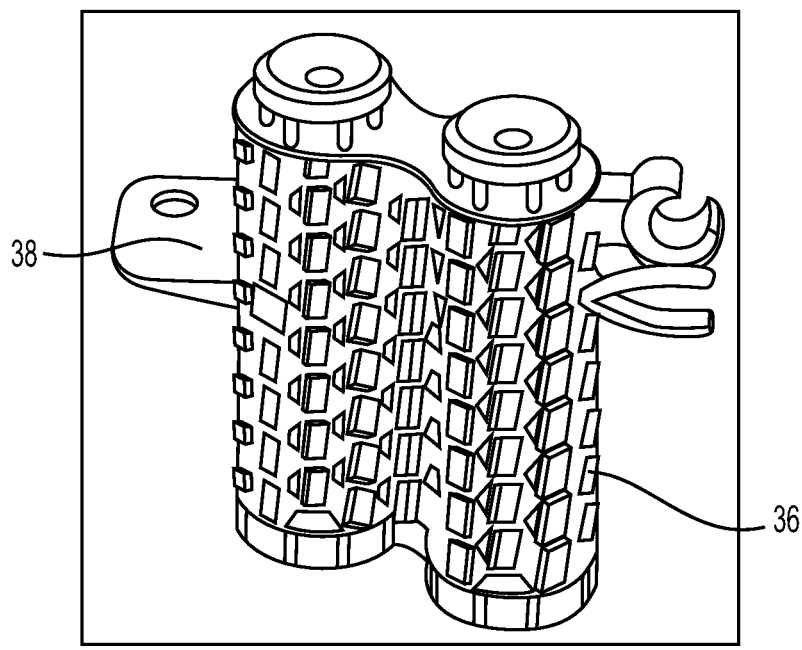
FIG. 7 is a detailed perspective view of one of the components shown in FIG. 5.
Figure 8:
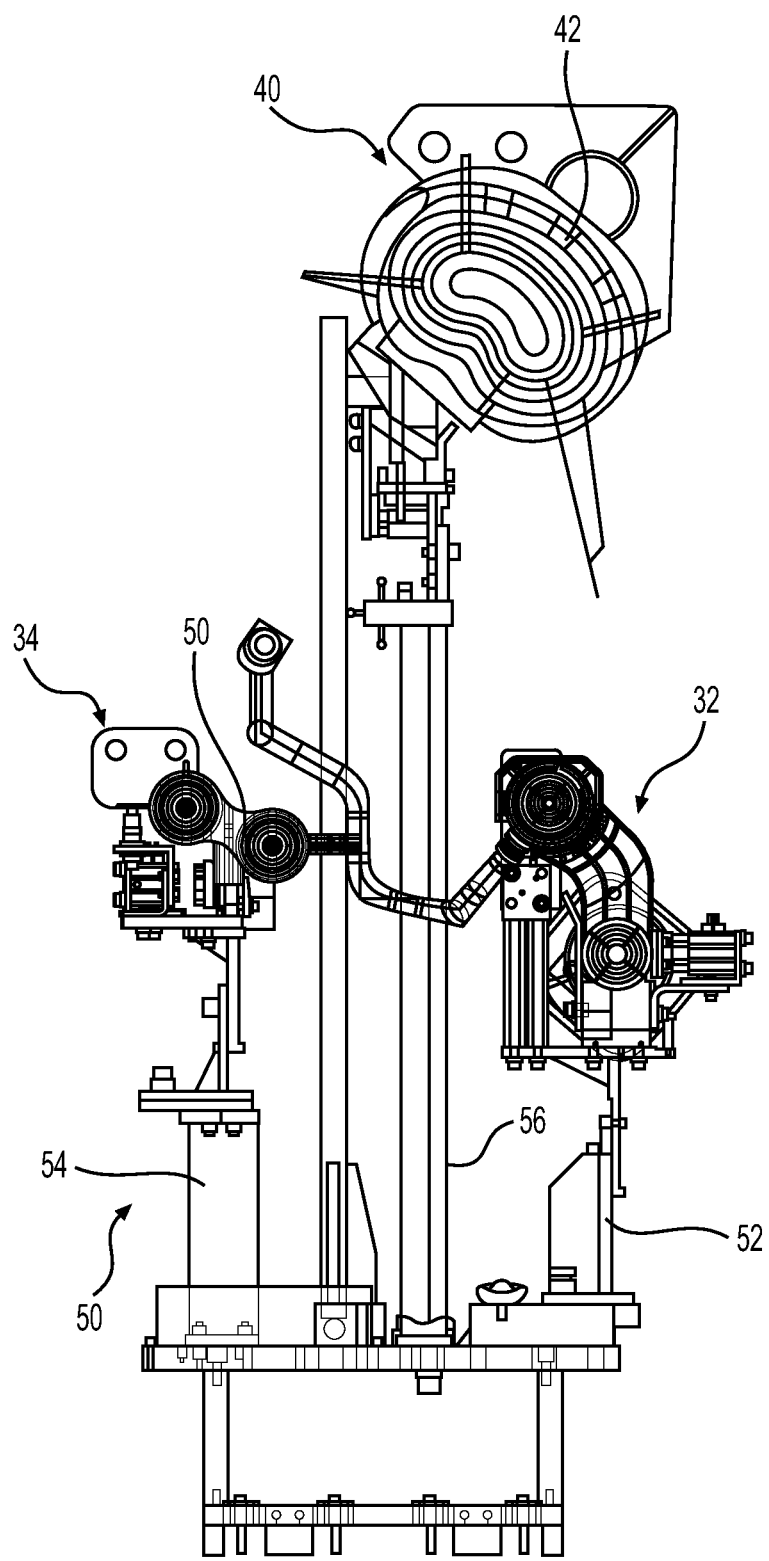
FIG. 8 is a schematic view of a jig that would hold the components within the parison during blow molding, shown with the components.

In the ongoing goal of improving performance and reliability, the present disclosure presents an internal structure for a BFS that reduces the amount of thermoplastic exposed to hydrocarbon diffusion. Referring to FIGS. 4-7, a blow molded fuel tank 30 is illustrated as exemplary. Fuel tank 30 may be formed of multilayer thermoplastic with a barrier layer or coating as the innermost layer. Tank 30 may be formed by a blow molded process starting with the multilayer parison inserted into tooling. As can be seen in FIG. 5, the internal components of tank 30 are isolated from each other and mounted separately within tank 30. Tank 30 may take many forms and shapes, and the illustrations should not be limiting in any way as to the shape of the tank. Tank 30 has complex contours and peaks and valleys on its exterior surface, all designed to fit closely within a designated spot in the undercarriage or in and around the engine compartment of a vehicle. As will be appreciated, the tank's design may address many functional and fit factors as necessary.

In FIG. 5, tank 30 is shown in phantom to illustrate as exemplary various internal components disposed in the tank. Valve 32 is illustrated as being disposed on the left in FIG. 5 and mounted on its own bracket, valve bracket 34. Fuel filter structure 36 may be separately mounted on its own filter bracket 38, and is illustrated as being disposed on the right hand side in FIG. 5. Similarly, as an example, regulator 40 may be provided and attached to the inside of the tank separately from the other components by regulator bracket 42. In FIG. 5, regulator 40 is shown in the front area of the tank. It will be understood that the particular orientation of the tank will affect the directional descriptions of the positions of the components. The components may also be located wherever necessary depending on the size and configuration of the tank, and its placement in the vehicle relative to other components to which the internal components must cooperate or to which they must connect or be in communication.

By separately mounting the internal components using a separate respective bracket for each component, the BFS fuel tank of the present disclosure reduces the overall amount of thermoplastic structure inside the tank which could produce a detrimental effect of volume reduction for fuel capacity due to hydrocarbon diffusion and consequent swelling of the thermoplastic bracket/baffle structure. The amount of swell or volume displacement is minimized or even eliminated by reducing the amount of thermoplastic internal structure. In addition, by enabling the components to be separately mounted and placed, the distribution may be engineered for optimal size and shape of the completed tank, and possibly even lower profile and compact shapes may be possible. Additional degrees of design freedom are afforded by the possibility of separate and distributed placement of the internal components.

Precise placement and attachment of the components inside of the tank is made possible by a jig that is designed to not only retain the components during blow molding, but also is outfitted with various sensors and adjustors to avoid any registration issues with the components inside the contours of the tank. Referring to FIGS. 8-15, jig 50 is provided to retain the various internal components within the parison and mold during blow molding. For exemplary purposes jig 50 is illustrated and described with respect to tank 30 and the three components described above. It will be understood that jig 50 can be customized as necessary for more or less components, and for placement of the components in various configurations. Broadly, as illustrated jig 50 comprises a workpiece holder for each internal component and elements for ensuring that the internal component will be placed precisely and without interfering with the tank or other components. In the orientation shown in FIG. 8, jig 50 is shown in side view if it were inserted into a parison and mold as in FIGS. 2-3. Therefore, the components are shown in end or top plan view. Valve holder 52 is shown on the right-hand side with valve bracket 34 and valve 32 placed on it. Filter holder 54 is shown on the left-hand side with filter bracket 38 and filter 36 placed on it. Regulator 40 with regulator bracket 42 is shown on regulator holder 56, and is shown in the central, top portion of FIG. 8. Jig 50 may have more elements to facilitate holding of the components as well as the tubing or connectors in a fashion to avoid interference with molding of the tank and interference with other components and to provide sufficient tolerances between parts. The vertical elements of jig 50 may be fitted with any number of retainers or spacers as necessary.

Figure 9:
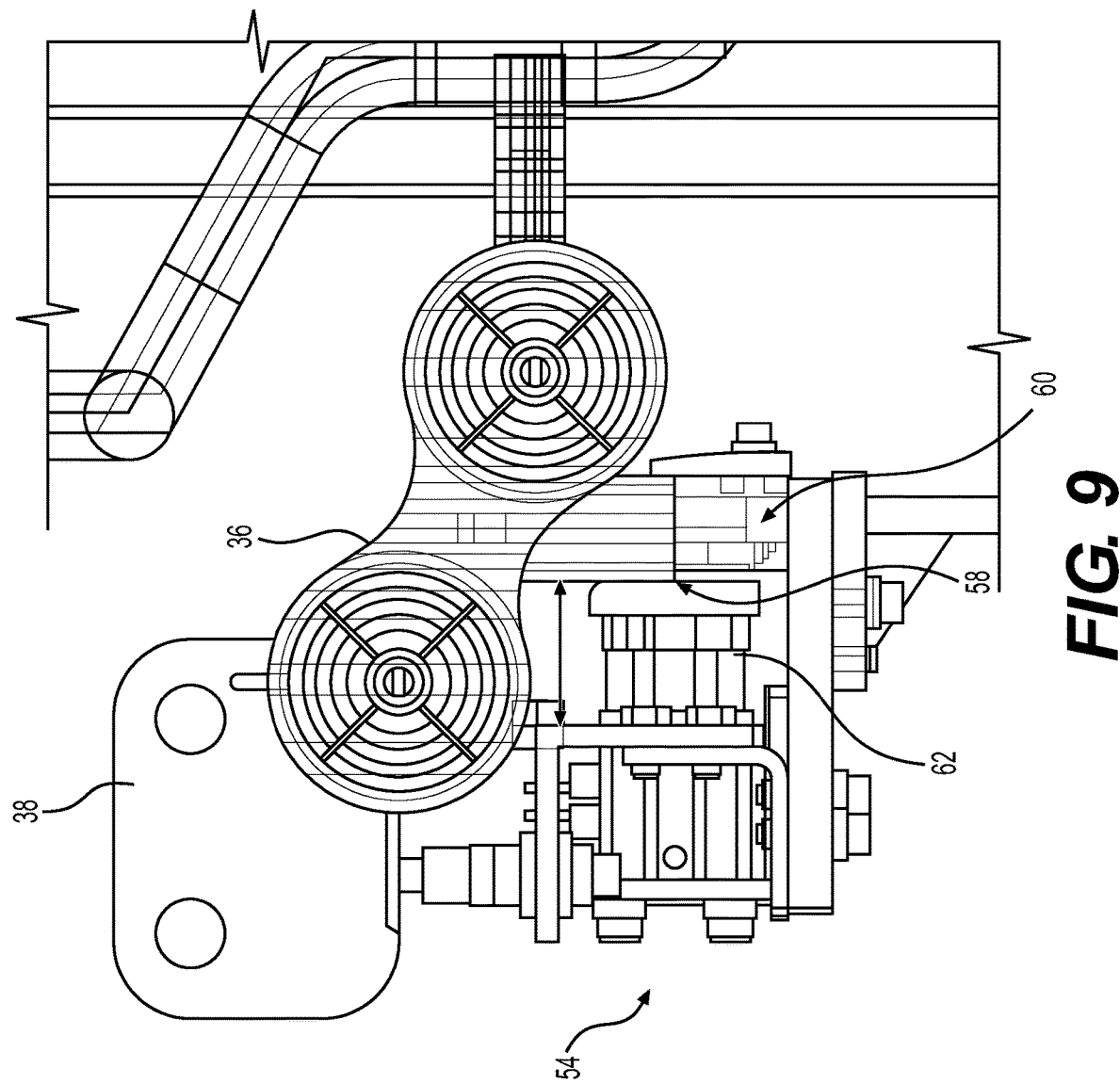
FIG. 9 is a detailed view of the component shown on the left in FIG. 8.

FIG. 9 is a closeup view of filter 36 and filter bracket 38 arranged on filter holder 54 of jig 50. As can be seen, filter clamp 58 is provided on holder 54 and a locking pin 60 is arranged on holder 54. Slides 62 move in the direction of the arrow to precisely place the filter internally in the tank. Various retainers maybe used to keep other elements in place during holding.

Figure 10:
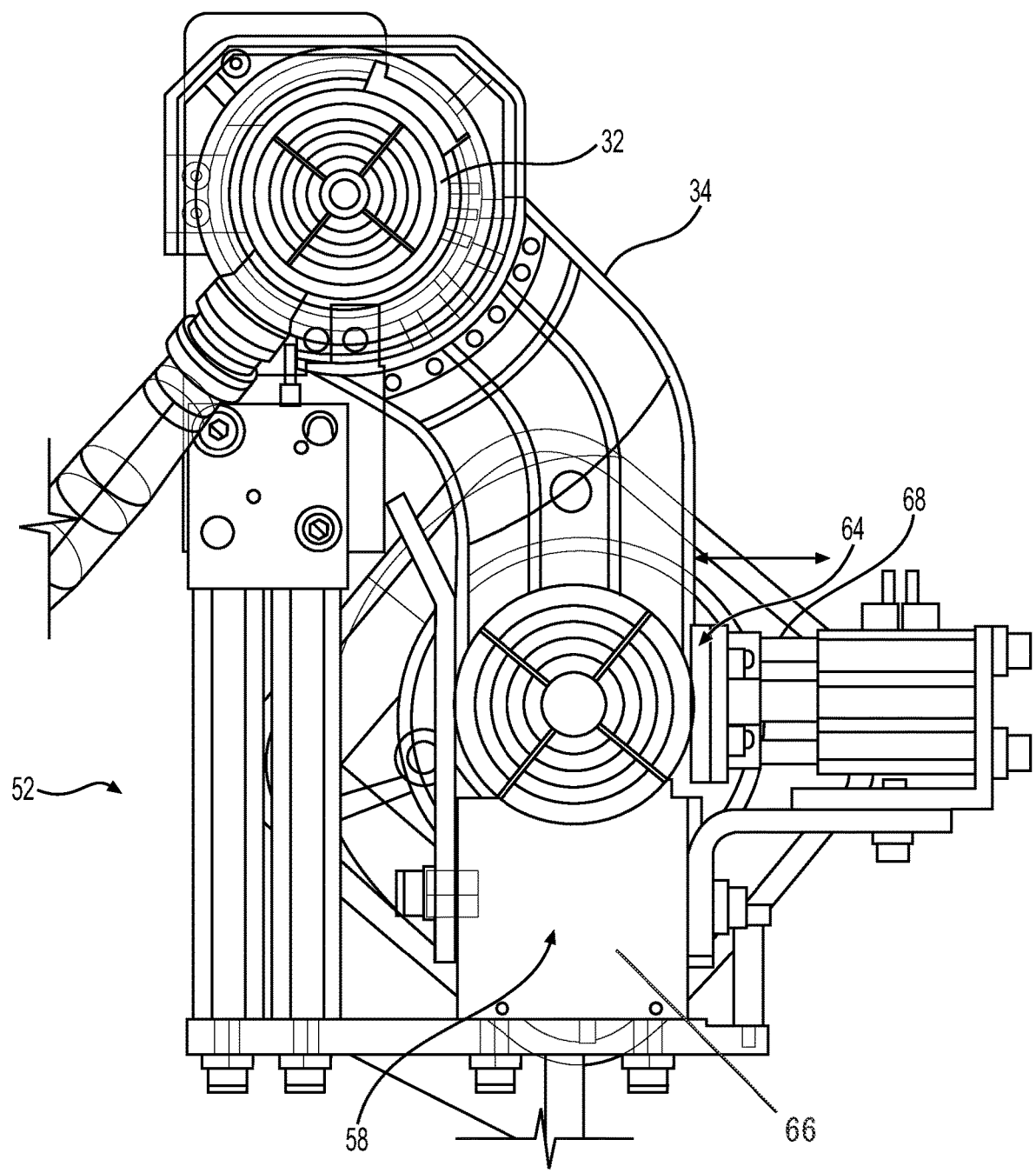
FIG. 10 is a detailed view of the component shown on the right in FIG. 8.

FIG. 10 is a closeup view of valve 32 and valve bracket 34 arranged on valve bracket holder 52 of jig 50. As can be seen, valve bracket clamp 64 is provided on holder 52 and a locking block 66 is arranged on holder 52. Slides 68 move in the direction of the arrow to precisely place the valve bracket internally in the tank. Various retainers may be used to keep other elements in place during holding.

Figure 11:
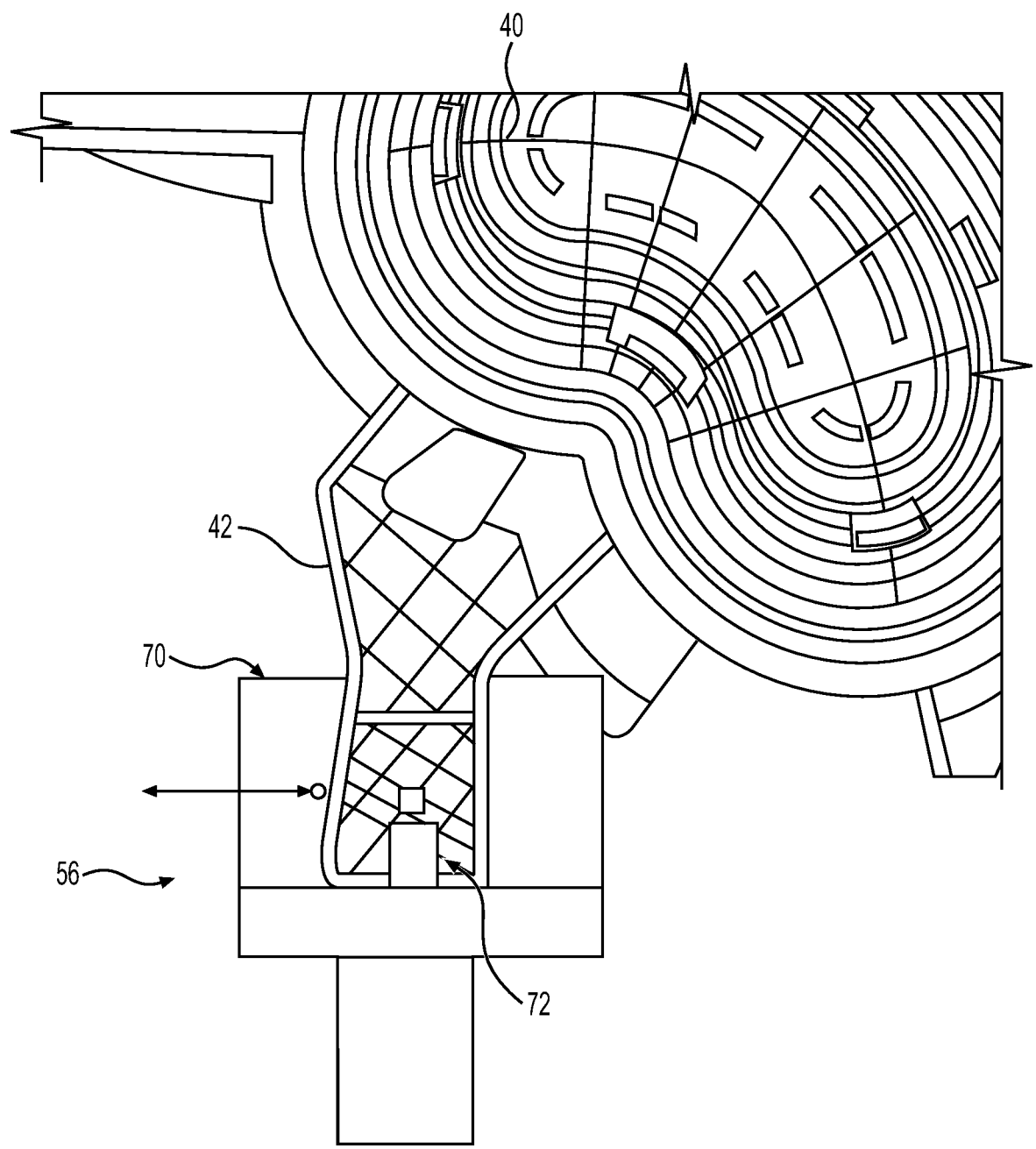
FIG. 11 is a detailed view of the component shown in the center, and upper portion of FIG. 8.

FIG. 11 is a closeup view of regulator 40 and regulator bracket 42 arranged on regulator holder 56 of jig 50. As can be seen, regulator clamp 70 is provided on holder 56 and a locking pin 72 is arranged thereto. The center of gravity of regulator 40 has a large offset from jig 50 which may make it shift when the jig travels vertically. In order to combat this type of shifting, clamp 70 is angled to eliminate shifting. Various retainers may be used to keep other elements in place during holding.

Figure 12:
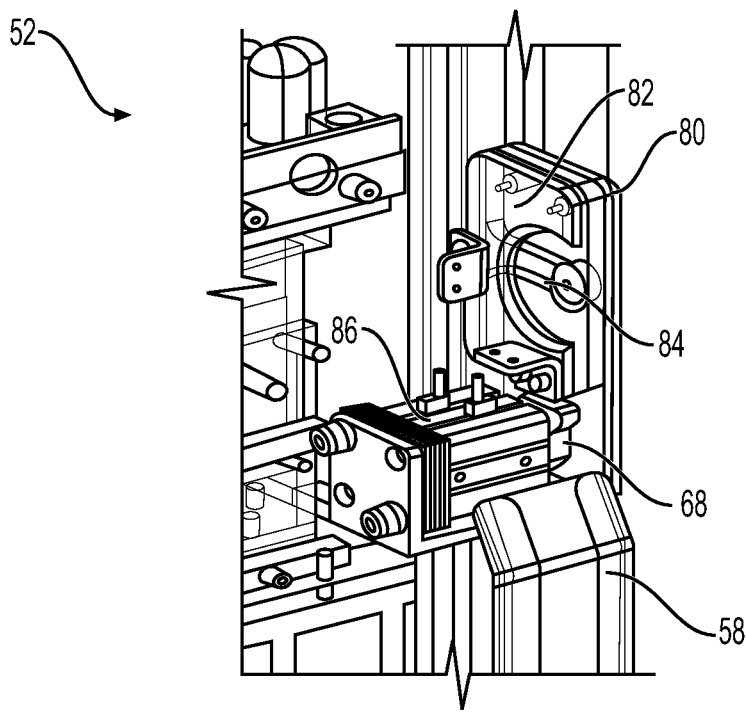
FIG. 12 is a detailed perspective view of the jig portion for the component of FIG. 10, shown without the component.
Figure 13:
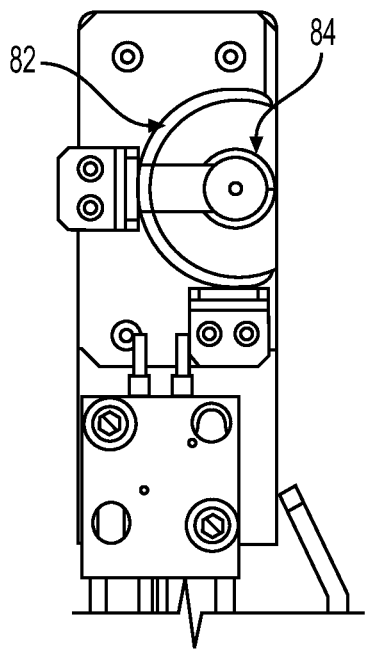
FIG. 13 is a front view of the jig portion of FIG. 12 shown without the component.
Figure 14:
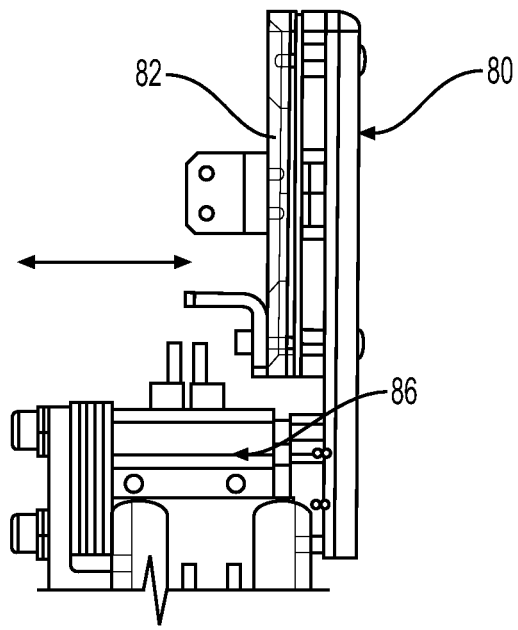
FIG. 14 is a side view of the jig portion of FIGS. 12 and 13 shown without a component.
Figure 15:
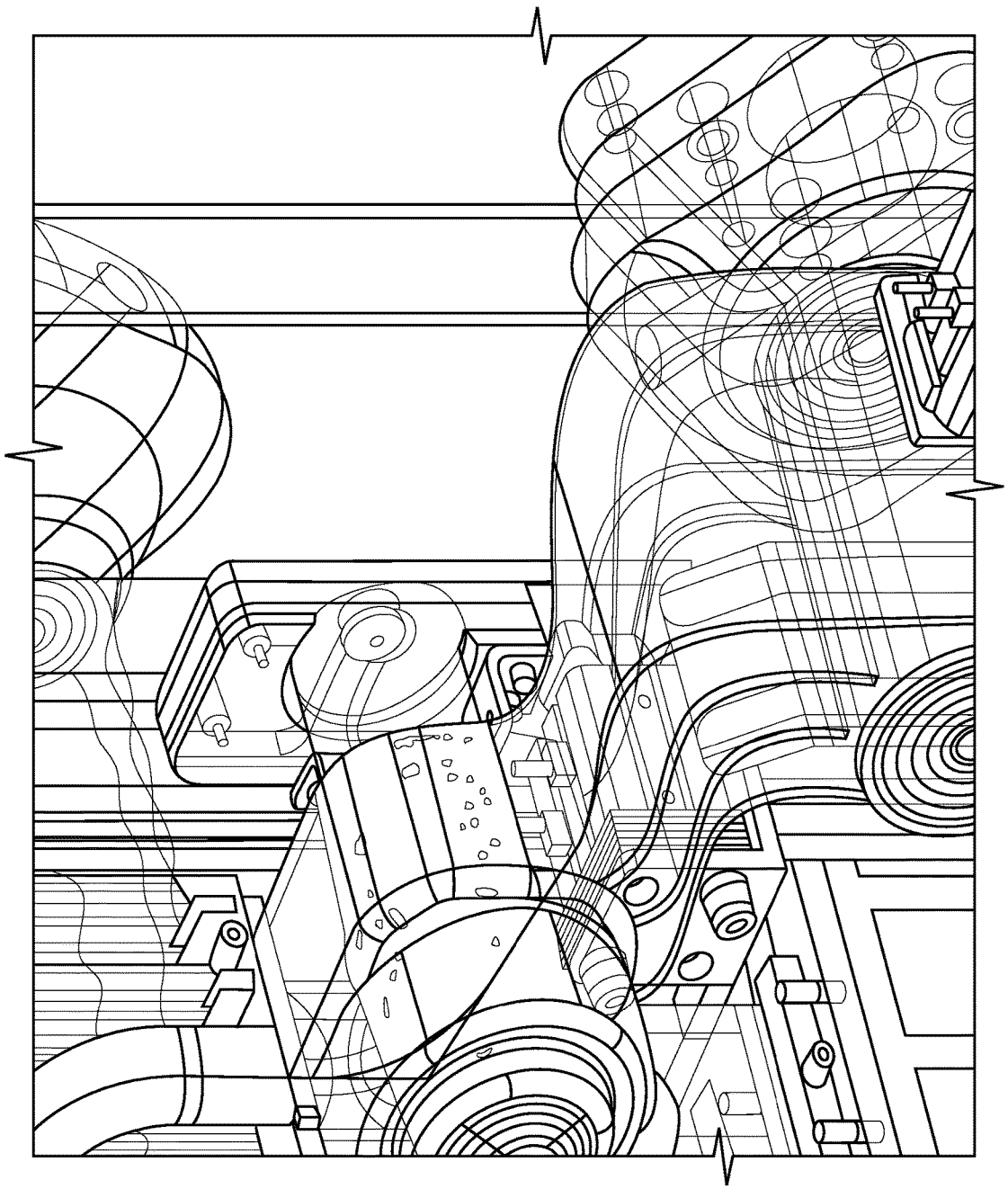
FIG. 15 is a perspective view similar to FIG. 12 shown with the component in position on the jig.

Referring to FIGS. 12-15, the elements associated with the valve bracket holder 52 are shown in even more detail to illustrate the multi-modal adjustments and testing that are included in jig 50 and its use. For clarity, FIGS. 12-14 are shown without the component, and FIG. 15 is shown with the component in phantom to illustrate the relative positions of the pieces.

In FIGS. 12-14, holder 52 is shown as having a backup plate 80 on which a bracket positioning plate 82 is attached. Bracket positioning plate 82 provides an arcuate registration surface for receiving a corresponding and mating surface of valve bracket 34. Within the registration area a load cell 84 may be provided for ensuring that excessive loads are not impinged on this piece during the molding process. If excessive compression loads are detected, the system may be configured to stop the molding process to avoid damage to either the resulting tank or the jig and components. Cylinders 86 into which slides 68 move are shown with clarity. Movement of the slides in and out of cylinders 86 in the direction of the arrow in FIG. 14 will move the bracket toward or away from the registration area and the load cell of the positioning plate. All of the slides and mating cylinders described and illustrated herein are driven by actuators, the operation of which is not presented in detail here.

FIG. 15 shows valve 32 in alignment with load cell 84 and depicts valve bracket 34 when holder 52 is loaded with its corresponding component. As can be seen, slides and cylinders will move the valve and valve bracket away and toward the backup plate assembly in order to ensure the correct placement of the valve bracket during the blow molding process for the blow molded tank.

The fine adjustments that may be necessary for precision placement of the components internally of the tank may be made by adjusting various elements of jig 50. Among some of the concerns in this type of multiple and separate internally placed structures, are ensuring that any of the peripheral pieces such as the vent tubes will not cause undue rotation of the brackets or interfere. This may be controlled by using the clamps to ensure proper clearances and retention of the vent tubes during blow molding. This same may be true if there are cutting operations necessary after molding, and the clamps may be used to ensure that no components or tubes or elements are in the way of cutting tools to avoid any damage to the internal components. In addition, the clamps and other retention elements may be employed to ensure proper clearance between the components and the parison during before, during and after blow molding.

Another possible concern is the potential of the internal components and bracket rotating due to their center of gravity and the jig position. As alluded to earlier in this description, the clamps and other retention elements may be employed to ensure the brackets are retained in an optimal position for blow molding and in the finished tank. A variety of geometric interlocks may be employed to ensure mechanical engagement of the clamps, retaining elements and/or locking pins and blocks to maintain the internal components in position. To ensure that all internal components are in place, any number of sensors may be added to the jig and system to detect present or absence of the components in the holders and their optimal positions. For example, the sensors maybe load cells to detect present or absence, or light sensors to detect coverage and therefore proper registration of the components. Any number and placement of sensors may be used to provide repeatability and precision to the placement of the internal components during blow molding. The sensors may be tied into the overall system to warn of mis-registration or missing components so the process may be stopped or adjusted before proceeding forward.

Another aspect of the disclosure is the use of welds after molding to ensure that the internal components are secured to the inside of the tank. Reducing the number of post-molding steps will improve efficiency, and this disclosure contemplates the use of a single weld of each bracket along an interior wall of the tank. The brackets are designed for single welds to be used for attachment, and sensors such as load cells may be added to the jig to monitor load pressure of the welding process as well and provide optimal weld depth. If the pressure is too high or too low, the process may be stopped and adjusted. The slides and cylinders may be employed to ensure proper weld pressure and to ensure there are no gaps between the brackets and the interior of the tank.

The separate and distributed brackets for internal components of the present disclosure reduce any detrimental effect from thermoplastic swell which can occur when a single piece, monolithic bracket structure is employed to span the inside of the tank to provide multiple mounting areas for the components. The detrimental effects being reduced volume for fuel, potential interference or reduced performance of the components over time as their positions change due to expansion of the single bracket, and potential inaccurate measurement by a level sensor component due to expansion of the singe bracket. The multiple separate brackets of the present disclosure reduce the overall amount of thermoplastic structure within the tank and reduce or eliminate the detrimental effects of a single piece bracket. The separate brackets of the present disclosure also provide more design freedom for lower overall thickness or design flexibility for the tank to fit into tighter spaces. In addition, the separate brackets may act as multiple baffles to reduce sloshing of the fuel in the tank and any associated noise.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A blow molding assembly for producing a blow molded tank, said assembly comprising:
 a mold adapted to be used in a blow molding machine, and movable from an open position to a closed position;
 a multi-layer thermoplastic parison adapted to be disposed in said mold;
 a jig for supporting fuel system components to be placed inside said tank, the jig adapted to be positioned within the parison and comprising a base, a first holder attached to said base and comprising a first component support platform for supporting a first fuel system component, said first component support platform comprises a registration element for accurately receiving the fuel system component thereon, and a second holder attached to said base and comprising a second component support platform for supporting a second fuel system component, said first holder and said second holder spaced apart from one another to thereby provide a first component bracket separately attached to the tank from a second component bracket.

2. The blow molding assembly of claim 1, wherein the blow molded tank has a molded body defining a wall with an exterior surface and an interior space, said tank comprising a first internal bracket supporting a first fuel system component attached to a first location on the wall within the interior space, a second internal bracket supporting a second fuel system component attached to a second location on the wall within the interior space, wherein said first internal bracket and said second internal bracket are separate from one another and not connected.

3. The assembly of claim 2, wherein said internal brackets of the blow molded tank are spaced apart from one another within the interior space.

4. The assembly of claim 3, wherein said internal brackets of the blow molded tank are plastic.

5. The assembly of claim 3, wherein at least one of said internal brackets of the blow molded tank includes a baffle appendage.

6. The assembly of claim 2, wherein the wall of said molded body has complex contours defining peaks and valleys.

7. The assembly of claim 2, wherein the blow molded tank further comprises a fuel inlet opening in said wall, and an engine fuel supply opening in said wall.

8. The assembly of claim 7, wherein one of said internal brackets of the blow molded tank is disposed proximate said supply opening and the fuel system component supported thereon is a fuel valve.

9. The of claim 8, wherein another of said internal brackets of the blow molded tank is spaced apart from said supply opening and the fuel system component supported thereon is a fuel pump.

10. The assembly of claim 3, wherein said internal brackets of the blow molded tank act as baffles to prevent sloshing noises from fuel movement within the tank.

11. A jig for supporting elements in tooling during a blow molding process to produce a blow molded tank with the elements placed inside the finished tank, said jig comprising:
   a base;
   a first holder attached to said base and comprising a first component support platform, a first clamp and a first registration element;
   a second holder attached to said base and spaced apart from said first holder, said second holder comprising a second component platform, a second clamp and a second registration element.

12. The jig of claim 11, further comprising a cylinder and slide mechanism on at least one of said first component support platform and said second component support platform to enable movement of the element toward or way from said registration element.

13. The jig of claim 12, further comprising on said first component support platform a backing plate onto which the element may impinge to ensure registration.

14. The jig of claim 13, further comprising a load cell mounted on said backing plate to monitor the load of the element being impinged thereon.

15. The jig of claim 11, wherein one of said first registration element and said second registration element is a locking pin.

16. The jig of claim 15, wherein the other of said first registration element and said second registration element is a locking block.

17. The assembly of claim 1, wherein said first component support platform further comprises a backing plate on which said registration element is disposed.

18. The assembly of claim 17, wherein said first component support platform further comprises a cylinder and slide mechanism mounted thereto enabling movement of the fuel system component toward and away from said registration element.

19. The assembly of claim 18, further comprising a sensor on said registration element for monitoring the force the fuel system component impinges on said registration element to ensure predetermined clearance and prevent damage to the fuel system component during molding.

* * * * *